United States Patent

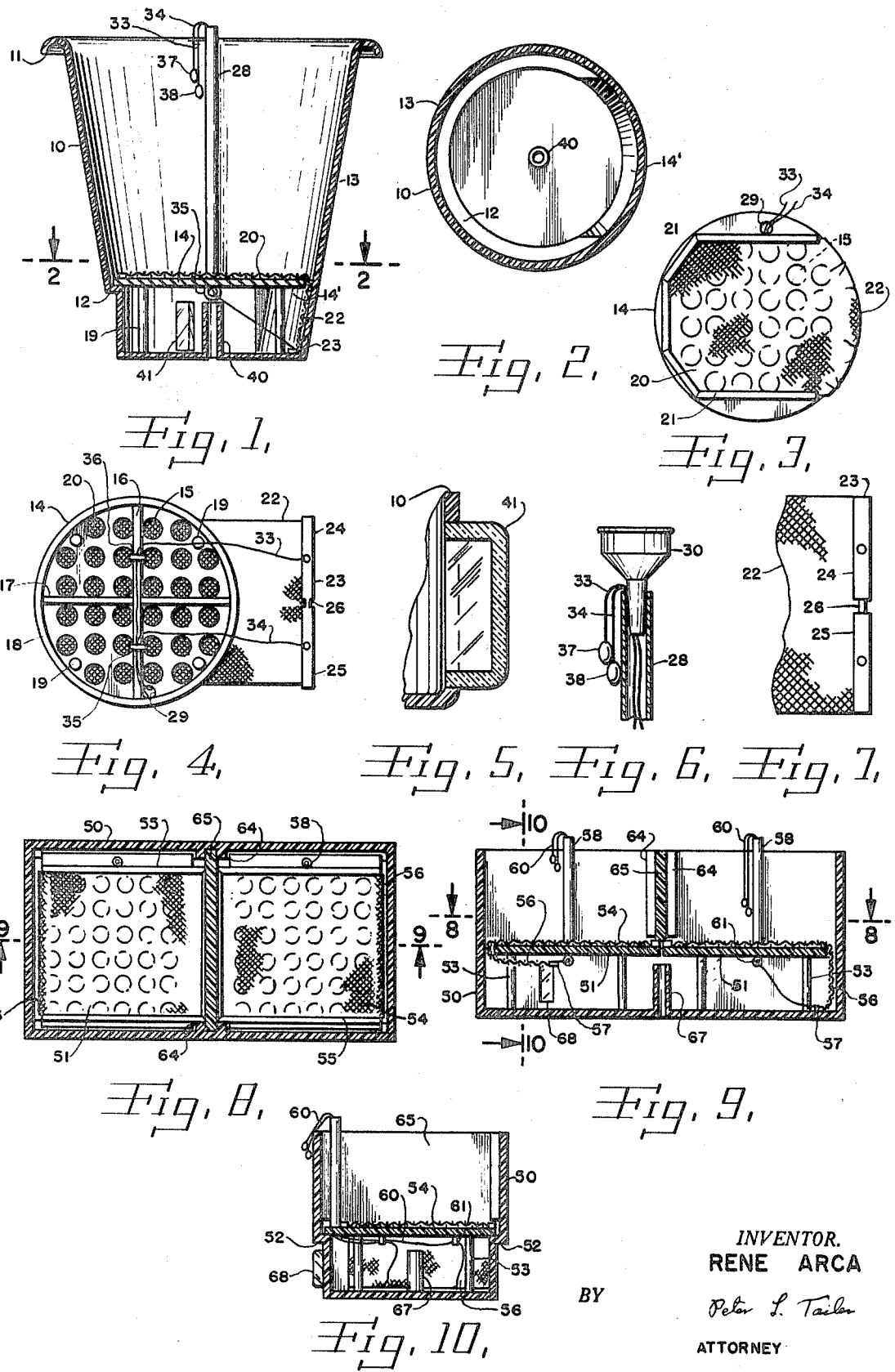

[11] 3,576,088

[72] Inventor Rene Arca
 71—11 Yellowstone Blvd., Forest Hills, N.Y. 11375
[21] Appl. No. 785,506
[22] Filed Dec. 20, 1968
[45] Patented Apr. 27, 1971

[54] PLANT RECEPTACLE WITH WATER SUPPLY
 5 Claims, 10 Drawing Figs.
[52] U.S. Cl. .................................................. 47/38.1, 239/57
[51] Int. Cl. ................................................ A01g 27/00
[50] Field of Search ...................................... 47/1.2, 34, 38, 38.1; 239/49, 50, 57

[56] References Cited
UNITED STATES PATENTS
650,614 5/1900 Roeseler ...................... 47/34
3,222,819 12/1965 Marcan ........................ 47/38.1
FOREIGN PATENTS
1,030,096 5/1958 Germany ...................... 47/38.1
291,411 9/1953 Switzerland ................. 47/38.1
408,515 9/1966 Switzerland ................. 47/38.1

Primary Examiner—Robert E. Bagwill
Attorney—Peter L. Tailer

ABSTRACT: A self-watering plant receptacle contains water in its bottom portion over which is disposed a perforated soil support covered with a material which extends over a side of the soil support into the water to form a wick. A filling tube extends down from the upper edge of the container through the soil support, the filling tube containing filaments extending therethrough connected to the bottom of the wick to draw it from the water and control water intake thereby.

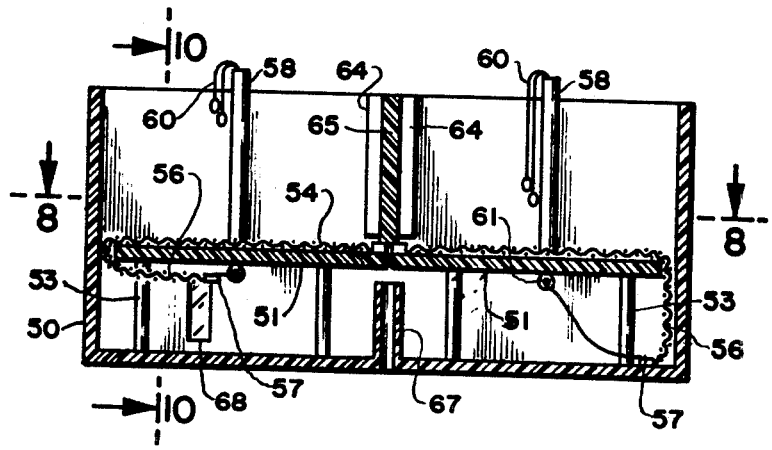

PLANT RECEPTACLE WITH WATER SUPPLY

BACKGROUND OF THE INVENTION

Plants in conventional receptacles, such as flower pots, window boxes, large and small planters, and the like, must be constantly watered according to the demands of different species of plants therein and according to particular atmospheric conditions. This watering represents constant plant care which is costly, time consuming, and inconvenient.

SUMMARY OF THE INVENTION

A plant receptacle has a bottom portion over which there is disposed a perforated soil support. The soil support may rest on legs or on a ledge formed in the receptacle. Wick material covers the perforated soil support and extends from one side thereof to form a single wick which hangs into water in the bottom of the receptacle. A weight is attached to the bottom of the wick to hold it in the water.

A filling tube extends from above soil level in the receptacle through the perforated soil support. Filaments connected to the weight at the bottom of the wick lead through eyelets on the bottom of the soil support so that pulling the filaments will draw a wick out of the water to control the amount of water fed to a plant. If desired, a wick and its weight may be split or trimmed to further control the amount of water drawn up to a plant.

Several adjacent soil support plates and their wicks may be placed in a single elongated receptacle. If desired, partitions may separate soil on adjacent soil support plates so plants with different moisture requirements may thrive side-by-side in the same receptacle. A water level overflow may extend upward from the bottom of a receptacle and a water level gauge in the form of a protruding transparent window may be formed in the side of the bottom of the receptacle.

This invention allows a householder to leave indoor plants unattended for long periods of time during a vacation. The invention may also be used in connection with large outdoor architectural planters and even for the growing of commercially valuable plants.

BRIEF DESCRIPTION OF THE DRAWING

FIG. 1 is a longitudinal, vertical section through a plant receptacle according to a first embodiment of my invention;

FIG. 2 is a section taken on line 2–2 of FIG. 1 with the soil support plate removed from the receptacle;

FIG. 3 is a top view of the soil support plate;

FIG. 4 is a bottom view of the soil support plate with a wick and its weight shown extending therefrom;

FIG. 5 is a vertical section through a protruding water level gauge window according to my invention;

FIG. 6 is a longitudinal secton through a broken away upper portion of a filling tube showing filaments extending therethrough and a funnel placed therein;

FIG. 7 is a plan view of a fragment of the end of a wick with a weight attached;

FIG. 8 is a horizontal section taken on line 8–8 of FIG. 9 showing a second embodiment of my invention in which the receptacle has a plurality of adjacent compartments;

FIG. 9 is a longitudinal, vertical section taken on line 9–9 of FIG. 8; and

FIG. 10 is a transverse vertical section taken on line 10–10 of FIG. 9.

DESCRIPTION OF THE PREFERRED EMBODIMENTS

As shown in FIGS. 1—7, the plant receptacle of the first embodiment of my invention has a graceful container 10 of any desired configuration which may have an upper lip 11. An annular internal upward facing shoulder 12 is formed from sidewalls 13 near the bottom of container 10. One portion or side 14′ of shoulder 12 is not formed for reasons which will be explained.

A soil support plate 14 contains evenly spaced circular perforations 15 and has the reinforcing crossmembers 16 and 17 and the annular circumferential reinforcing member 18 formed on its bottom surface. Legs 19 may be provided to support the plate 14. The entire plate 14 is best molded in one piece from a suitable plastic, but it may be fabricated otherwise if desired. A covering 20 of any suitable wick material extends over the perforations 15 and is disposed on top of plate 14. Covering 20 may be clamped in place by members 21 at its edges or it may be heat sealed in place if plate 14 and covering 20 are of compatible plastic material.

Covering 20 extends to hang from one edge of plate 14 to form a single wick 22 having a plastic weight 23 fixed to its free end. Weight 23 has a plurality of portions 24 and 25 between which there is a thin easily cut or broken section 26. The portions 24 and 25 of weight 23 may be separated and wick 22 split to provide a reduced water-carrying capacity.

A water-filling tube 28 extends from the top of container 10 through aperture 29 in plate 14 so that when soil (not shown) is placed in container 10 on plate 14, water may be poured into container 10 through tube 28 by means of a funnel 30 as shown in FIG. 6. The portion 14′ of container 10 where shoulder 12 is not formed allows wick 22 to hang downward into the water in the bottom of container 10. Two filaments 33 and 34 extend from the section 24 and 25 of weight 23 through eyelets 35 and 36 formed on the bottom of plate 14 and then through aperture 29 and filling tube 28. Beads 37 and 38 may be placed on the ends of the filaments 33 and 34 so they will not fall down tube 28. Pulling filaments 33 and 34 will lift weight 23 and wick 22 from the water in container 10 to control the supply to a plant. If wick 22 is split in two parts, they can be individually raised from the water. In this manner, the amount of water drawn up wick 22 onto cover 20 to be available to a plant is controlled.

Container 10 has a central overflow 40 projecting upward from its bottom so that container 10 cannot be overfilled with water. A water level gauge 41, as shown in FIG. 5, is formed as a projecting transparent window within which the water level may easily be seen. Gauge 41 may be glued or molded in place.

From the foregoing, it may be seen that the plant receptacle of this invention may be left unattended for long periods of time. Water will be constantly conducted up wick 22 to be made available to a plant growing in soil resting on cover 20. Wick 22 may be split to reduce the amount of water conducted to a given plant according to its known requirements. In the event of an increase in atmospheric humidity or other changed conditions, one or more portions of a wick 22 may be raised out of water by pulling filaments 33 and 34.

Soil support plate 14 may rest completely on legs 19 if no shoulder 12 is provided. However, the provision of a shoulder 12 may enable a soil support plate to rest thereon so that legs 19 are not required. Shoulder 12 also serves to prevent soil from falling between the edge of plate 14 and wall 13 of container 10.

Referring now to FIGS. 8—10, a second embodiment of this invention provides an elongated container 50 with a plurality of perforated soil support plates 51 therein. Plates 51 may rest on the longitudinal shoulders 52 or on legs 53. Plates 51 have covers 54 of wick material fixed over them by strips 55 which extend over one side to form the wicks 56 with the weights 57 attached thereto as in the first embodiment of my invention.

Each plate 51 has a water-filling tube 58 extending through it from the top of container 50. Filaments 60 extend through the tubes 58 and the eyelets 61 to the weights 57 so that wicks 56 may be lifted from the water to control the supply drawn to each cover 54 as in the first embodiment of this invention. Guide strips 64 enable a partition 65 to be inserted to separate the space above adjacent plates 51 to allow plants with different water requirements to be grown in a single container 50. Partition 65 covers the abutting edges of adjacent plates 51.

An upstanding water overflow tube 67 is provided in container 50 as well as a projecting transparent water level gauge 68.

While my invention has been shown and described in the best forms known to me, it will nevertheless be understood that these are purely exemplary and that modifications may be made without departing from the spirit and scope of the invention except as it may be more limited in the appended claims wherein:

I claim:

1. A self-watering plant receptacle comprising, in combination, a container, a soil support plate disposed over the bottom of said container defining a water reservoir in the bottom of said container, said soil support plate containing perforations, a covering of wick material extending over the perforations in said soil support plate and extending beyond said soil support plate to hang downward forming a wick extending into said water reservoir, a water-filling tube extending downward from the top of said container through said soil support plate, eyelets on the bottom of said soil support plate, a weight at the end of said wick, and filaments attached to said weight extending through said eyelets and through said water-filling tube to draw said weight and said wick upward in said water reservoir.

2. The combination according to claim 1 wherein said weight is formed having a plurality of portions and having a thin, easily severed section between adjacent portions, one of said filaments being connected to each portion of said weight.

3. The combination according to claim 2 wherein said container is elongated and has a plurality of adjacent soil support plates therein, and with the addition of a removable partition extending across said container dividing said container above adjacent soil support plates.

4. The combination according to claim 3 wherein said soil-support plates have legs and are supported on said legs in said container.

5. The combination according to claim 3 wherein said soil support has upward facing shoulders, said soil support plates resting on said shoulders.